United States Patent [19]

Takehara

[11] Patent Number: 5,374,867
[45] Date of Patent: Dec. 20, 1994

[54] CORELESS MOTOR

[75] Inventor: Isamu Takehara, Tokyo, Japan

[73] Assignee: Seiko Instruments Inc., Japan

[21] Appl. No.: 95,967

[22] Filed: Jul. 22, 1993

[30] Foreign Application Priority Data

Aug. 3, 1992 [JP] Japan .................. 4-206697

[51] Int. Cl.⁵ ............................................ H02K 3/00
[52] U.S. Cl. .................................. 310/198; 310/154; 310/207; 310/266
[58] Field of Search ............ 310/266, 198, 207, 180, 310/184, 49 R, 203, 204, 208, 154, 217

[56] References Cited

U.S. PATENT DOCUMENTS

| | | | |
|---|---|---|---|
| 4,060,746 | 11/1977 | Heraud | 310/266 |
| 4,370,581 | 1/1983 | Nakamura | 310/266 |
| 4,412,146 | 10/1983 | Futterer | 310/266 |
| 4,437,029 | 3/1984 | Ban | 310/198 |
| 4,583,016 | 4/1986 | Ban | 310/198 |
| 5,270,602 | 12/1993 | Takehara | 310/198 |

FOREIGN PATENT DOCUMENTS

| | | | |
|---|---|---|---|
| 0719762 | 10/1965 | Canada | 310/198 |
| 0700895 | 12/1979 | U.S.S.R. | 310/198 |

*Primary Examiner*—R. Skudy
*Attorney, Agent, or Firm*—Bruce L. Adams; Van C. Wilke

[57] ABSTRACT

A coreless motor has a permanent magnet integrated with a casing, a commutator, and a rotor coil unit integrated with an output shaft. The rotor coil unit is comprised of an integral number of coil blocks superposed with one another. Respective coil blocks have a displacement angle of $X_M = 360 \times M/n$ degrees relative to a reference coil block, wherein $X_M$ denotes the displacement angle of the Mth coil block relative to the reference block, M denotes a positive integer from 1 to $n-1$ (the Mth coil block relative to the reference block), and n represents the number of coil blocks and is an even integer having a value of 4 or more. Each coil block shares a center angle of $X_2 + 360/P$ degrees, wherein $X_2$ denotes the displacement angle of the second coil block relative to the reference block, and P denotes the number of poles of the permanent magnet. The coil blocks are connected in series to form respective phases of the rotor coil blocks such that the rotor coil blocks of each phase pass an electric current in the same direction. By this construction, the coreless motor has an even number of coil blocks superposed with one another at a predetermined displacement angle and, as a result, the coreless motor can produce a higher output torque through a series connection of coils and has a reduced number of junction nodes as compared to a motor utilizing a parallel connection.

10 Claims, 7 Drawing Sheets

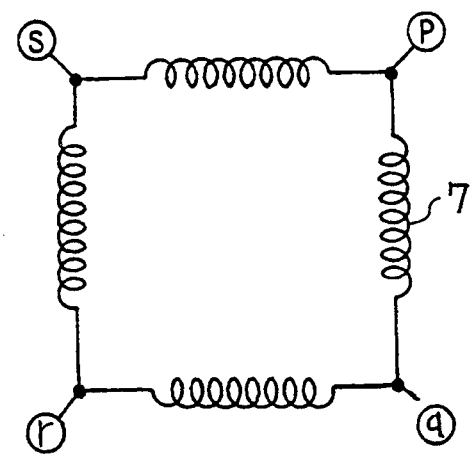
F I G. 11
PRIOR ART
F I G. 12  PRIOR ART
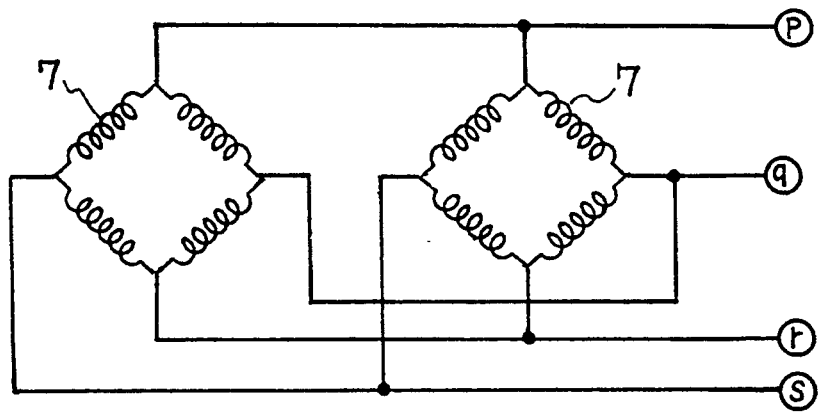
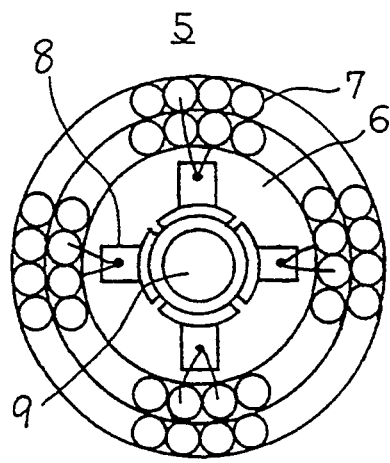
F I G. 13
PRIOR ART

CORELESS MOTOR

BACKGROUND OF THE INVENTION

The present invention relates to a coreless motor having a permanent magnet fixed to a casing and formed with an even number of poles, a rotor coil unit integrated with an output shaft, and a commutator.

There has been known the conventional coreless motor of the cylindrical type used in office equipment, a robot, a medical instrument and so on, which require a high performance motor featuring a high efficiency as well as a quick start/stop motion.

FIG. 7 is a structural diagram of the prior art motor. In manner similar to other types of motors, there are included a rotor 5 and a stator composed of a permanent magnet 4. The rotor 5 includes a rotor coil unit 7 which solely contributes to generation of output torque. The motor further comprises a rotor holder 6 which supports the coil unit 7, a commutator mechanism composed of commutator segments 8 for controlling a rotation direction, and an output shaft 9 for rotatably supporting the rotor. On the other hand, the stator is constructed such that a bearing housing 2 having bearings 3 contains therein the fixed magnet 4. A casing 1 is fixed to the bearing housing 2 to cover entirely the housing, while the casing 1 functions as a return yoke of the magnet 4. An electric current is fed to the rotor Coil unit 7 of the rotor 5 via lead wires 12, contacts of a brush 10 and respective commutator segments 8. A pair of washers 13 are disposed on outer faces of the respective bearings 3, and a stopper ring 14 is fixed to the output shaft 9 in order to suppress axial movement of the rotor 5 during the course of rotation. A cap 15 is fixed to an inner portion of a rear cover 11 to block entry of exterior dust.

The conventional coreless motor has a winding structure shown in FIGS. 8, 9 and 10 wherein the rotor coil unit 7 has a plurality of coils terminating in terminals or taps p, q, r and s. When the coils are laid out as shown in FIGS. 9-10, they have a diameter dimension La. The rotor coil unit 7 of the coreless motor is connected electrically as shown in FIG. 11 to form the rotor 5 as shown in FIG. 13. As understood from FIG. 13, this coreless winding is formed such that the coil unit 7 of the rotor 5 has a radial thickness defined by two layers of the windings. However, since the radial thickness is limited to twice the diameter of the coil wire, the conventional structure has the drawback that the coil wires cannot be wound thick freely thereby limiting the amount of copper in the coil unit.

Particularly in reducing the motor size, while an energy product of the magnet has been improved efficiently, a magnetic motive force of the coil of the rotor has not been improved efficiently. Stated otherwise, in reducing the motor size, the magnetic loading has been improved while the electric loading has not been improved. The motor output torque cannot be optimally improved unless a design balance is ensured with respect to a ratio between the magnetic loading and the electric loading. In view of this, it is necessary to broaden optimally a space gap between the magnet and the casing so as to increase the copper amount of the rotor coil unit. In order to increase the copper amount of the coreless coil, it is necessary to increase the radial thickness of the cylindrical coil unit.

It might be advisable to form multiple stages of the cylindrical coil units. However, for example, in case that respective stages of the coil units are connected in parallel to each other as shown in FIG. 12, there may be caused the drawback that an inductive voltage coefficient Ke cannot be raised adequately in the multiple-stage motor. There is a problem that the series connection is needed in order to increase the value Ke in the prior art.

SUMMARY OF THE INVENTION

Accordingly, in order to solve the afore-mentioned problem of the prior art, an object of the invention is to provide a coreless motor having a series connection structure featuring a high output torque. According to the invention, in the coreless motor having a permanent magnet integrated with a casing, a rotor coil unit integrated with an output shaft, and commutator segments, the rotor coil unit is comprised of n number of coil blocks superposed with one another such that each coil block has a pair of side edge portions sharing a center angle or an angular interval of $(X_2+360/P)$ degrees so that respective one of the coil blocks have a shift angle $X_M = 360 \times M/n$ degrees relative to a reference one of the coil blocks, where M denotes a positive integer of "1" to "n−1", n denotes "4" or more even number, and P denotes a number of poles of the permanent magnet.

In the coreless motor constructed as described above, when a given voltage is applied to an input terminal of the rotor coil unit, an electric current flows through each phase of the coil blocks of the rotor coil unit in the same direction. Consequently, the output shaft of the coreless motor rotates due to a magnet force of the magnetic and a magnetic motive force of the rotor coil unit.

BRIEF DESCRIPTION OF THE DRAWINGS

FIG. 11 is a schematic connection diagram of a coil in the conventional coreless motor.

FIG. 12 is a schematic parallel connection wiring diagram of a coil in the conventional coreless motor.

FIG. 13 is a diagram showing a coil of the conventional coreless motor, viewed from a motor output shaft.

DETAILED DESCRIPTION OF THE INVENTION

Figure 1:
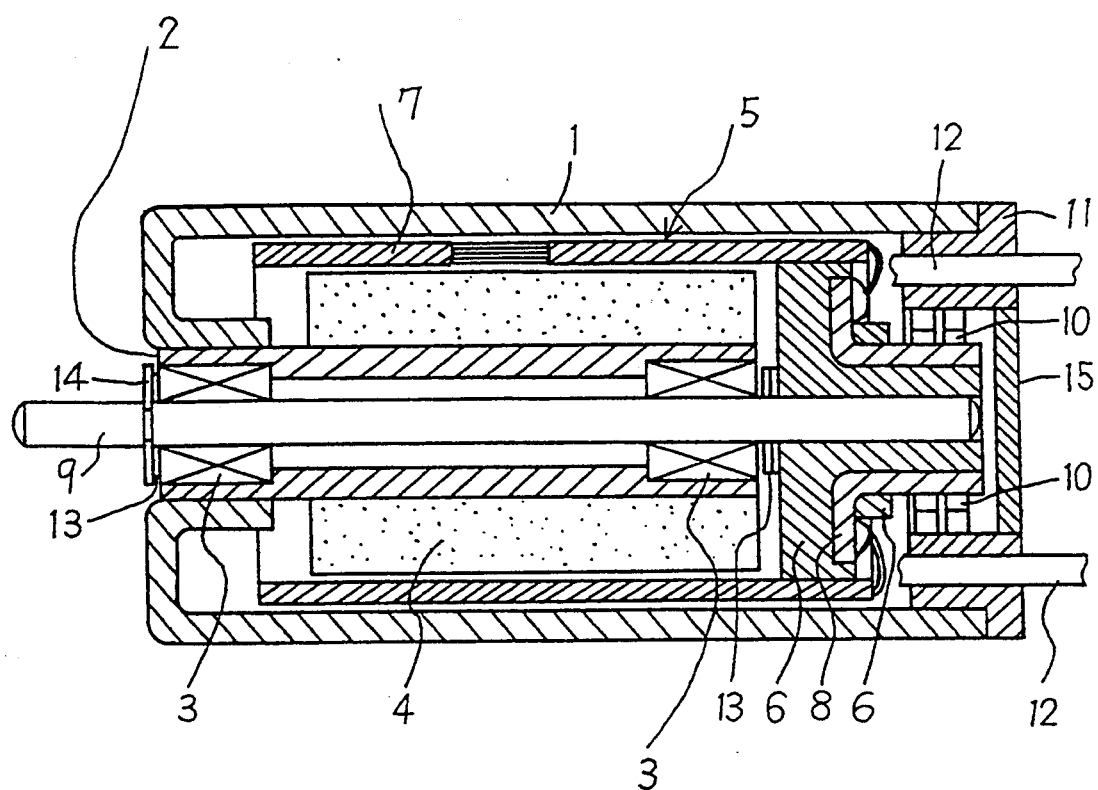
FIG. 1 is a structural diagram of the inventive coreless motor.

Hereinafter, embodiments of the present invention will be described in conjunction with the drawings. Referring to FIG. 1, the inventive coreless motor has a magnet 4, a permanent bearing housing 2, bearings 3 and a casing 1, constructed similarly as the conventional coreless motor. Further, there are provided a rotor coil unit 7, a holder 6 for supporting the coil unit 7, an output shaft 9, commutator segments 8, a brush 10, a rear cover 11 and lead wires 12.

The inventive coreless motor is different from the conventional coreless motor, substantially in the winding and connecting structure of the rotor coil unit 7. The embodiment of the rotor coil unit is shown in FIGS. 2–6 according to the invention. FIG. 3 is a basic circuit diagram showing a ring connection of the embodiment according to the invention. A pair of coils 61 and 62 are connected in series to each other between terminals or taps p and q. Another pair of coils 63 and 64 are connected between terminals or taps q and r. A further pair of coils 65 and 66 are connected between terminals or taps r and s. Furthermore, a pair of coils 67 and 68 are connected between terminals or taps s and p. The coils 61–68 are arranged to constitute the rotor coil unit 7 of FIG. 1.

Figure 4:
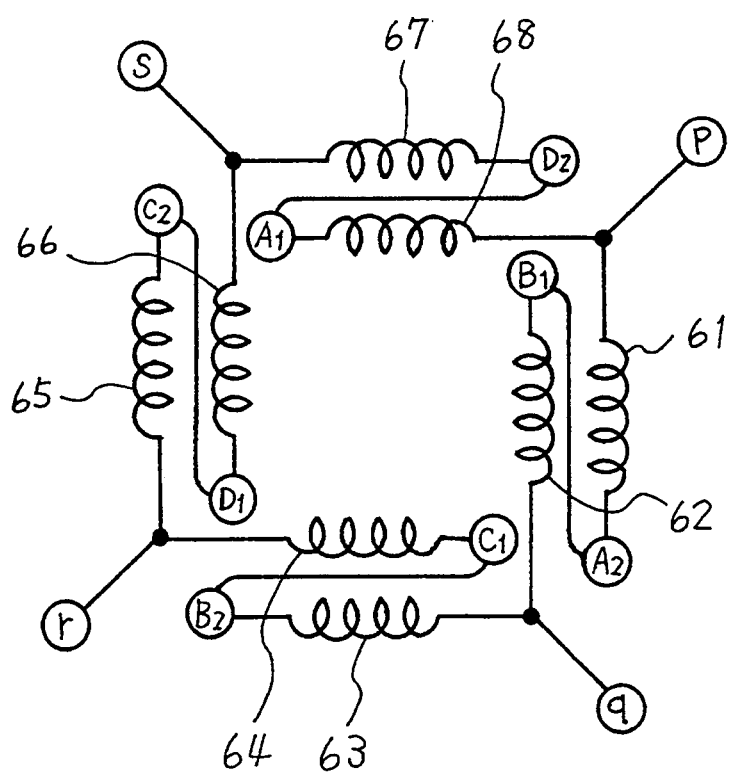
FIG. 4 is a schematic diagram of a rotor coil unit in one embodiment of the coreless motor according to the invention.

FIG. 4 is a basic coil arrangement diagram of the embodiment of the rotor coil unit 7 according to the invention. The coils 61 and 62 are overlapped with one another between the terminals p and q through intermediate nodes $A_2$ and $B_1$. The coils 63 and 64 are overlapped with one another between the terminals q and r through intermediate nodes $B_2$ and $C_1$. The coils 65 and 66 are overlapped with one another between the terminals r and s through intermediate nodes $C_2$ and $D_1$. The coils 67 and 68 are overlapped with one another between the terminals s and p through intermediate nodes $D_2$ and $A_1$. In this configuration, the nodes $B_1$ and $D_2$ are arranged adjacently to the terminal or tap p, the nodes $A_2$ and $C_1$ are disposed adjacently to the terminal q, the nodes $B_2$ and $D_1$ are positioned adjacently to the terminal r, and the nodes $C_2$ and $A_1$ are disposed adjacently to the terminal s.

Next, a description is given for the operation of the embodiment of the invention. Referring to FIG. 4, the terminal p is applied with a positive potential and the other terminal r is applied with a negative potential at a given moment, while the remaining terminals q and s are turned off. An electric current flows through the coils 61 and 62 such that respective electric current components of coils 61 and 62 flow in the same direction. Consequently, the coils 61 and 62 can generate a magnetic field in the same direction. In similar manner, the pair of coils 63 and 64, the pair of coils 65 and 66, and the pair of coils 67 and 68 may generate a magnetic field in the same direction, respectively. The output shaft 9 of the coreless motor rotates due to interaction between the magnetic fields of the coils 61–68 and the magnetic field of the permanent magnet 4.

At a next step, the terminal q is applied with a positive potential and the other terminal s is applied with a negative potential, while the remaining terminals p and r are turned off. An electric current flows through the coils 63 and the coil 64 in the same direction. In similar manner, the pair of coils 65 and 66, the pair of coils 67 and 68, and pair of coils 61 and the 62 can generate a magnetic field in the same direction, respectively. The output shaft 9 of the coreless motor rotates according to the magnetic fields of the coils 61–68 and the magnetic field of the magnet 4. Thereafter in similar manner, the polarity of voltages applied to the respective terminals is switched sequentially to continue the rotation of the output shaft 9 of the coreless motor.

Figure 5:
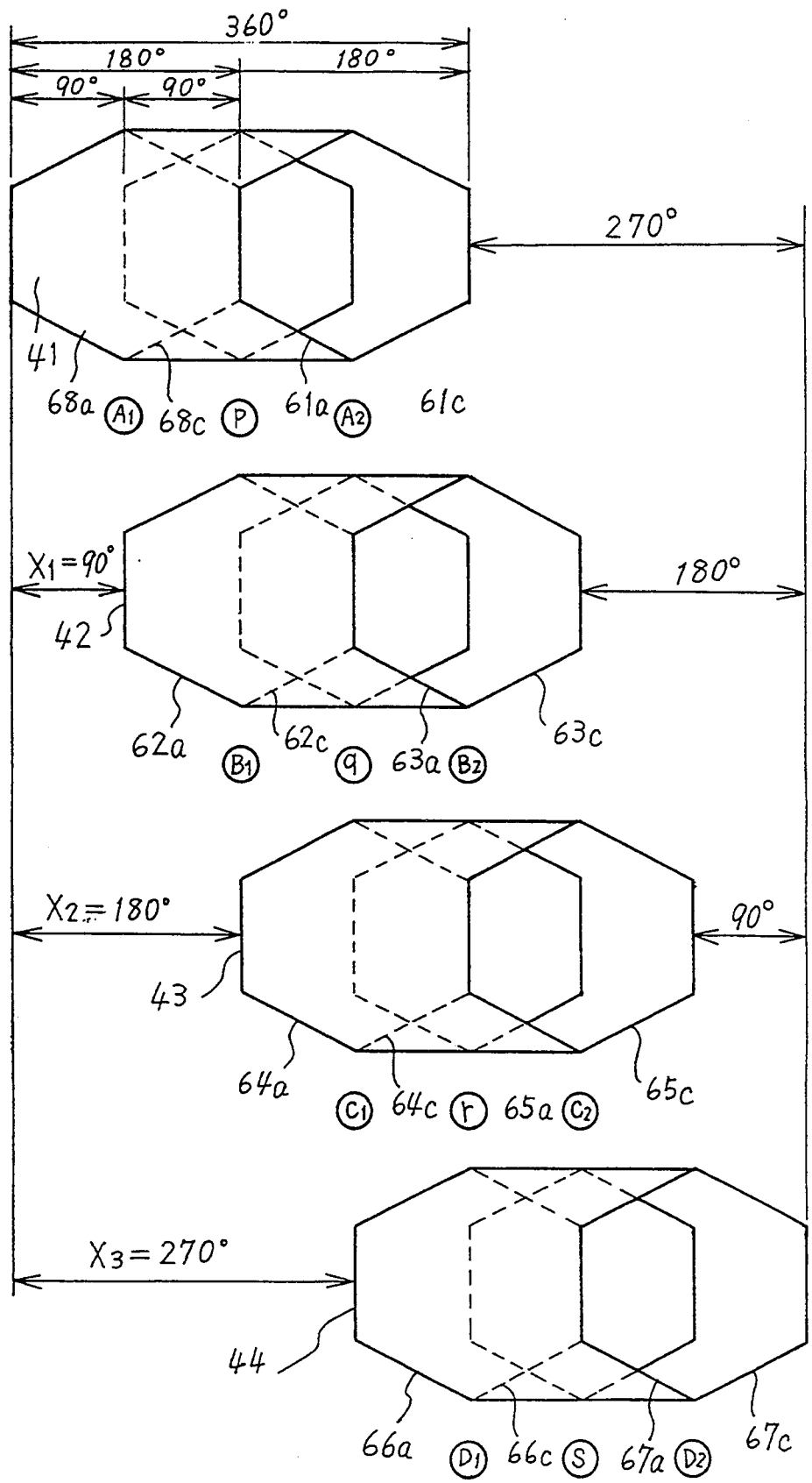
FIG. 5 is a coil arrangement diagram of one embodiment of the coreless motor according to the invention.

FIG. 5 is a coil block arrangement diagram of the embodiment according to the invention. A coil block 41 is formed of hexagonal coils which are wound from a start node $A_1$. The coils are wound spirally and sequentially in the rightward direction when the figure is viewed from the front side. A front coil 68a and a rear coil 68c are disposed in opposed relation and are arranged from the winding start node $A_1$ to the intermediate tap p. Next, a front coil 61a and a rear coil 61c are disposed in opposed relation and are arranged from the intermediate tap p to the winding end node $A_2$. A coil pitch of the hexagonal configuration, i.e., a pitch interval from the winding start node $A_1$ to the intermediate tap p is set to 90 degrees in terms of a mechanical angle which is defined as an angular pitch between side lines of adjacent hexagonal configurations.

Further, similarly a pitch interval is set to 90 degrees in terms of the mechanical angle between the intermediate tap p and the winding end point $A_2$. A closed circuit composed of a single loop of the coil wound spirally has a coil pitch interval which is set substantially identical to a magnetic pole pitch interval of the magnet 4 (which has two poles in this embodiment). Namely, the coil pitch interval is set to 180 degrees in this embodiment. In the coil block 41, the mechanical angel is set to 180 degrees between the leading side line of the front coil 68a and the side line of the rear coil 68c. Though, this value of 180 degrees is a whole node pitch on the design configuration, the mechanical angle may be set more than or less than 180 degrees according to a design choice. Further, a front coil 61a and a rear coil 61c are disposed in superposed relation between the intermediate tap p and the winding end node $A_2$. The coil block 41 has the entire pitch interval of 360 degrees in terms of the mechanical angle.

In a manner similar to the first coil block 41, the coil block 42 includes a front or top coil 62a and a rear or back coil 62c disposed in opposite faces between the winding start node $B_1$ and the intermediate tap q. Further, a front coil 63a and a rear coil 63c are disposed in superposed relation between the intermediate tap q and the winding end node $B_2$. The coil block 42 has a certain mechanical angel, between side lines thereof, set similarly as the coil block 41. The coil block 42 is shifted or displaced from the coil block 41 by 90 degrees in terms of the mechanical angle. In a manner similar to the first coil block 41, the third coil block 43 has a front coil 64a and a rear coil 64c which are overlapped with each other between the winding start node C1 and the intermediate tap r. Further, a front coil 65a and a rear coil 65c are disposed in opposite faces between the intermediate tap r and the winding end node $C_2$. The coil block 43 has a certain mechanical angel, between separate side lines, set similarly as the first coil block 41. The coil block 43 is displaced from the first coil block 41 by 180 degrees in terms of the mechanical angle. The coil block 44 has a certain mechanical angle, between separate side line, set similarly as the first coil block 41. The coil block 44 is displaced from the first coil block 41 by 270 degrees in terms of the mechanical angle.

Figure 6:
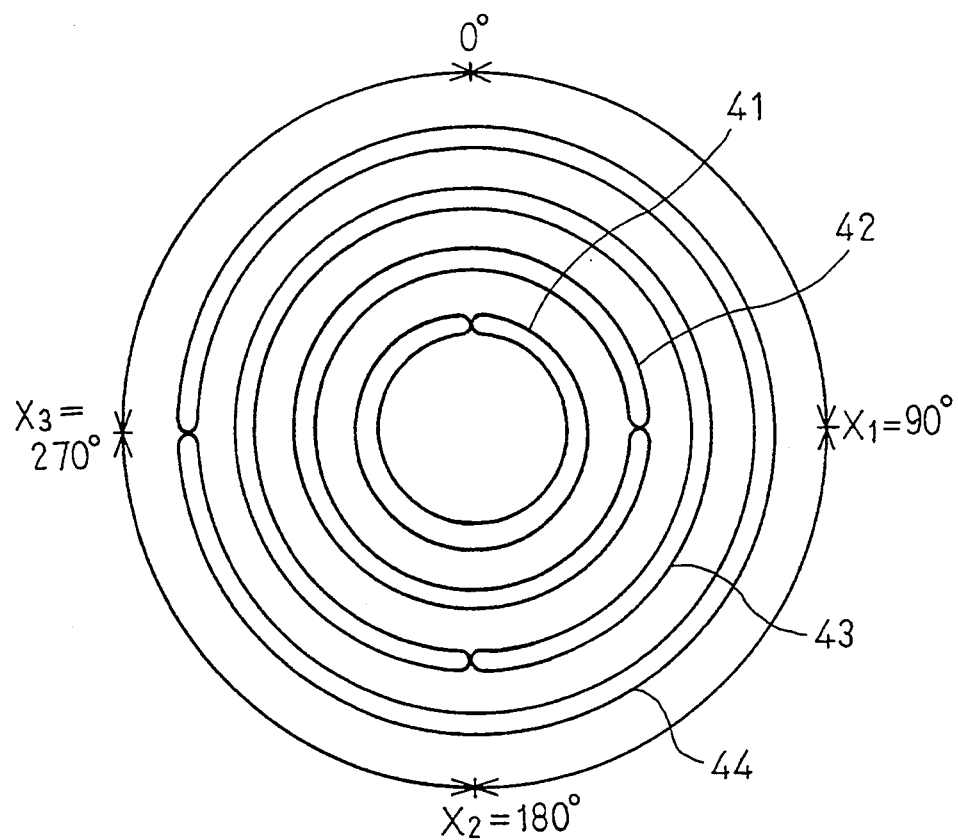
FIG. 6 is a diagram showing a laminate structure of the coil block in one embodiment of the coreless motor according to the invention, observed from a motor output shaft.
Figure 7:
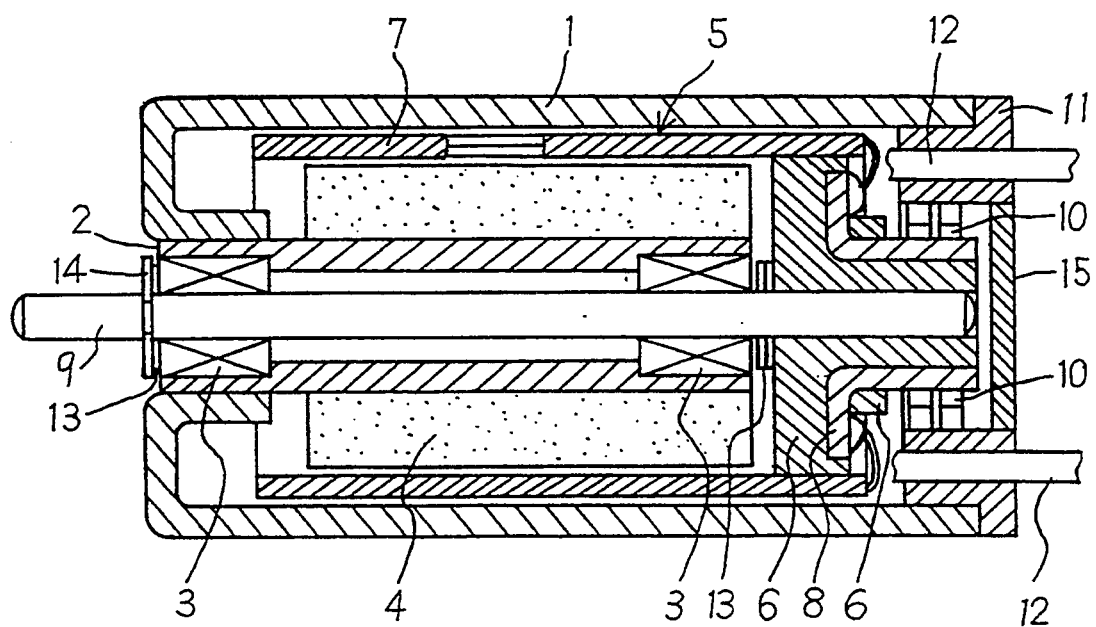
FIG. 7 is a structural diagram of the conventional coreless motor.
Figure 8:
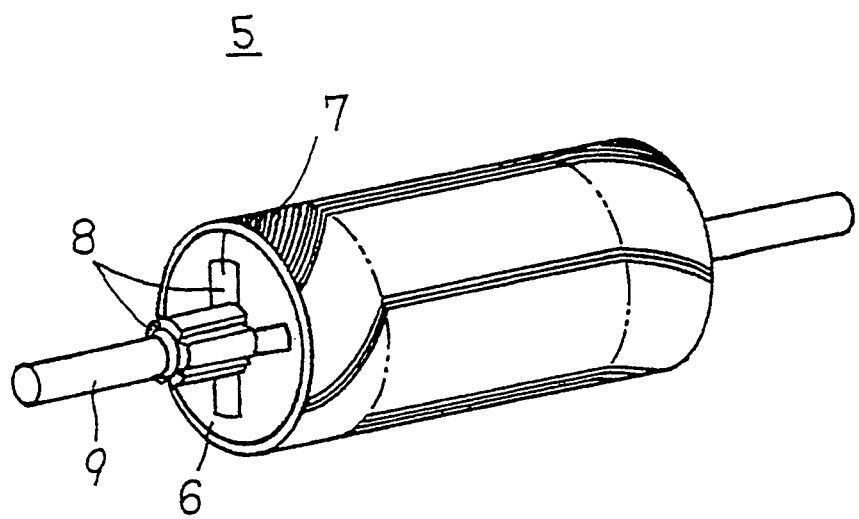
FIG. 8 is a perspective view of a rotor coil unit in the conventional coreless motor.
Figure 9:
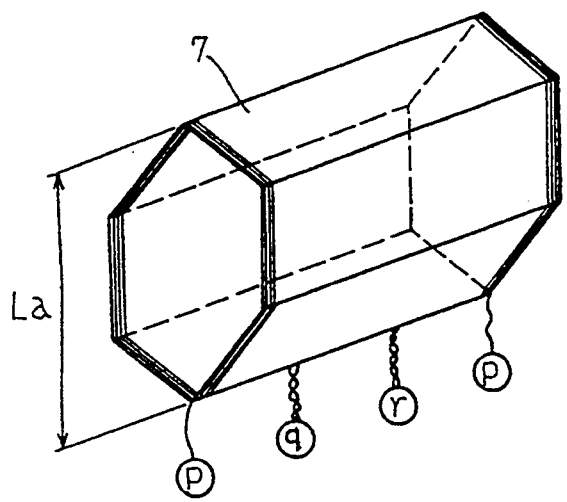
FIG. 9 is a perspective view of coil windings in the conventional coreless motor.
Figure 10:
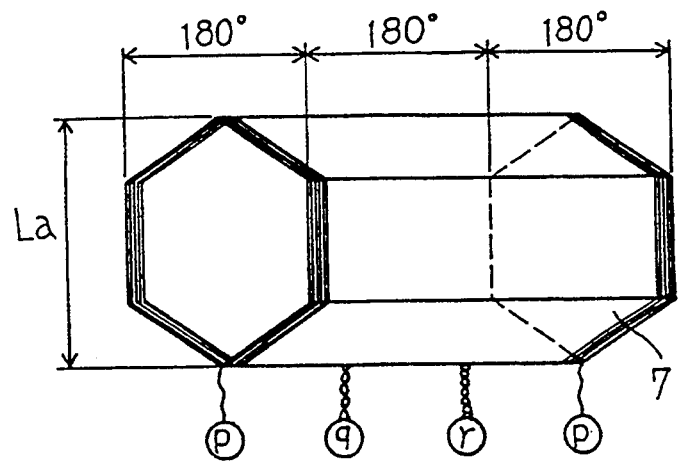
FIG. 10 is a plan view of coil windings of the conventional coreless motor in the flat form.

FIG. 6 is a schematic sectional view of the overlapping structure of the coil blocks 41, 42, 43 and 44 observed from an axial direction of the motor output shaft. The winding start portion and the winding end portion of each coil block overlap with one another by 90 degrees, because each block has an entire pitch interval of 360 degrees in terms of the mechanical angle.

Figure 2:
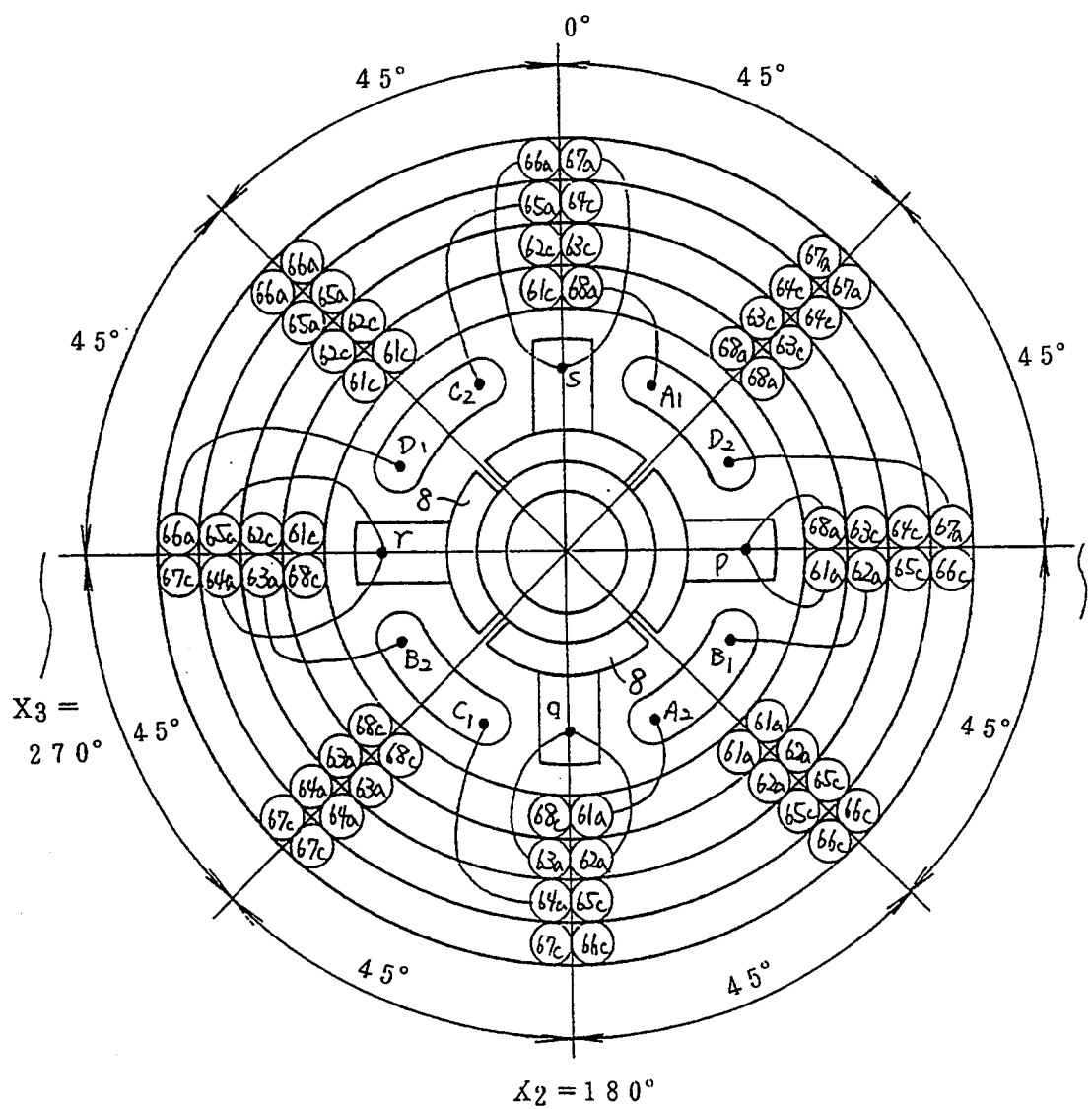
FIG. 2 is a connection wiring diagram of one embodiment of the coreless motor according to the invention.
Figure 3:
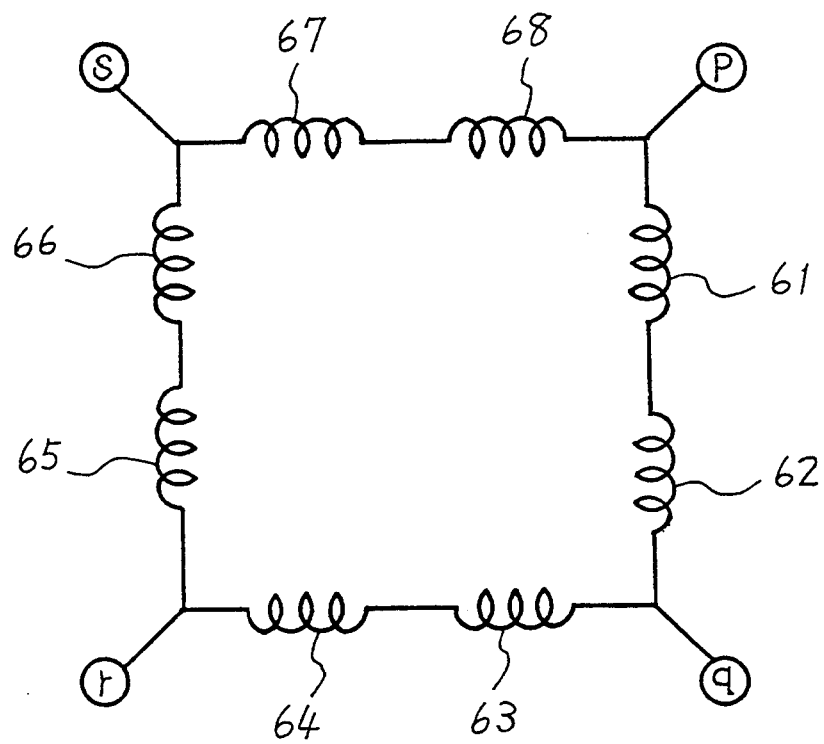
FIG. 3 is a basic connection wiring diagram of one embodiment of the coreless motor according to the invention.

FIG. 2 is a schematic lead pattern diagram showing an electrical connection among the front end rear coils 61a, 61c through 68a, 68b of the coils 61–68, the junction node or pad patterns $A_1/D_2$, $B_1/A_2$, $C_1/B_2$ and $D_1/C_2$ and the terminals or taps p, q, r and s of the commutator segments 8. In the present embodiment, the coils 61–68 are superposed with one another in four layers throughout the entire length of a circle.

The inventive coreless motor has n number of coil blocks. In case of the embodiment shown in FIGS. 2, 5, and 6, the phase number is set n=4. A shift angle of each coil block is represented as follows:

$$X_1 = 360/n = 90°$$

$$X_2 = 360 \times 2/n = 180°0$$

$$X_3 = 360 \times 3/n = 270°$$

Accordingly, the shift or displacement angle $X_M$ of the M-th coil block is represented generally by $X_M = 360 \times M/n$ degrees, where M denotes a positive integer "1"–"n−1", n denotes an even number of "4" or more. Further, each coil shares a center angle or an angular interval of $(X_2 + 360/p)$ degrees, where p denotes a pole number of the magnet. As described above, according to the invention, the coreless motor has an even number of coil blocks superposed with one another at a predetermined shift angle, thereby achieving the following effects:

(1) The coreless motor can produce a high output torque through a series connection of coils.

(2) There can be a reduced number of junction nodes as compared to the parallel connection.

What is claimed is:

1. A coreless motor comprising:
   a permanent magnet integrated with a casing and having an even number of poles;
   a commutator; and
   a rotor coil unit integrated with an output shaft, the rotor coil unit being comprised of n number of coil blocks superposed with one another, each coil block sharing a center angle of $X_2 + 360/P$ degrees, respective ones of the coil blocks having a displacement angle of $X_m = 360 \times M/n$ degrees relative to a reference one of the coil blocks where M denotes a positive integer from "1" to "n−1"n denotes an even integer of "4" or more, $X_2$ denotes a value of $X_M$ when $M=2$, and P denotes a number of poles of the permanent magnet, and wherein the coil blocks are connected in series so as to form respective phases of the rotor coil blocks such that the coil blocks of each phase can pass an electric current in a same direction.

2. A coreless motor according to claim 1; wherein the permanent magnet has two poles.

3. A coreless motor according to claim 1; wherein the n number of coil blocks are superposed in n number of layers each of circular configuration and laminated together to form the rotor coil unit.

4. A coreless motor, comprising: a stator comprised of a permanent magnet having a plural number of poles; and a rotor coil unit having an output shaft and mounted to undergo rotation relative to the stator, the rotor coil unit comprising a plurality of coil blocks superposed with one another such that respective ones of the coil blocks have a shift angle relative to a reference one of the coil blocks of $X_m = 360 \times M/n$ and such that each coil block shares a center angle of $X_2 + 360/P$ degrees, wherein $X_M$ is a value in degrees and denotes a shift angle relative to the reference coil block, n is an even integer value of 4 or more and denotes the number of coil blocks, M is a positive integer between 1 and n−1 and denotes and Mth coil block relative to the reference coil block, and P denotes the number of poles of the permanent magnet.

5. A coreless motor according to claim 4; including means electrically connecting coils of the coil blocks in series.

6. A coreless motor according to claim 5; wherein the coil blocks are arranged so that electric current flows in the same direction through the coils of all the coil blocks to produce magnetic fields in the same direction which coact with a magnetic field produced by the permanent magnet to effect rotation of the output shaft.

7. A coreless motor according to claim 4; wherein the coil blocks are arranged so that electric current flows in the same direction through the coils of all the coil blocks to produce magnetic fields in the same direction which coact with a magnetic field produced by the permanent magnet to effect rotation of the output shaft.

8. A coreless motor according to claim 4; wherein the number of coil blocks n is 4, such that a second one of the coil blocks relative to the reference coil block has a shift angle relative to the reference coil block of $X_2 = 360 \times 2/4 = 180$ degrees.

9. A coreless motor according to claim 8; wherein the number of poles is 2, such that each coil block shares a center angle of $180 + 360/2 = 360$ degrees.

10. A coreless motor according to claim 4; wherein the n number of coil blocks are superposed in n number of layers each of circular configuration and laminated together to form the rotor coil unit.

* * * * *